United States Patent [19]
Copeland

[11] Patent Number: 6,036,315
[45] Date of Patent: Mar. 14, 2000

[54] OPTICALLY SUPERIOR DECENTERED OVER-THE-COUNTER SUNGLASSES

[76] Inventor: Victor L. Copeland, 16560 Rambla de Las Flores, Rancho Santa Fe, Calif. 92067

[21] Appl. No.: 09/040,765

[22] Filed: Mar. 18, 1998

[51] Int. Cl.⁷ .................. G02C 7/02; G02C 7/10
[52] U.S. Cl. .................. 351/163; 351/41; 351/44; 351/159
[58] Field of Search ................ 351/41, 44, 163, 351/164, 165, 159

[56] References Cited

U.S. PATENT DOCUMENTS

| | | |
|---|---|---|
| 1,332,410 | 2/1920 | Potts . |
| 1,354,040 | 9/1920 | Hammon . |
| 1,536,828 | 5/1925 | Drescher . |
| 1,619,341 | 3/1927 | Gagnon . |
| 1,697,030 | 1/1929 | Tillyeb . |
| 1,741,536 | 12/1929 | Rayton . |
| 1,910,466 | 5/1933 | Glancy . |
| 2,406,608 | 8/1946 | Joyce ............................ 2/14 |
| 2,442,849 | 6/1948 | Glazer ........................... 88/54 |
| 4,515,448 | 5/1985 | Tackles .......................... 351/41 |
| 4,613,217 | 9/1986 | Fuerter et al. .................. 351/176 |
| 4,741,611 | 5/1988 | Burns ............................ 351/44 |
| 4,761,315 | 8/1988 | Logan et al. ................... 428/33 |
| 4,859,048 | 8/1989 | Jannard ......................... 351/159 |
| 4,867,550 | 9/1989 | Jannard ......................... 351/47 |
| 5,050,979 | 9/1991 | Shinohara ...................... 351/159 |
| 5,050,980 | 9/1991 | Shinohara ...................... 351/167 |
| 5,208,614 | 5/1993 | Jannard ......................... 351/41 |
| 5,555,038 | 9/1996 | Conway ......................... 351/159 |
| 5,648,832 | 7/1997 | Houston et al. ................. 351/159 |
| 5,774,201 | 6/1998 | Tackles .......................... 351/159 |

FOREIGN PATENT DOCUMENTS 456321  5/1949  Canada .

*Primary Examiner*—Scott J. Sugarman
*Attorney, Agent, or Firm*—Stetina Brunda Garred & Brucker

[57] ABSTRACT

Optically superior eyeglasses comprising a frame and a pair of lenses which are attached to the frame and are positionable over respective ones of the wearer's eyes. Each of the lenses defines an optical center and comprises a convex front surface having a first radius of curvature and a concave back surface having a second radius of curvature which is less than the first radius of curvature so as to impart a negative power to the lens. The frame is sized and configured such that when positioned upon the wearer's head, the lenses are supported thereby in a manner wherein the normal line of sight of each of the wearer's eyes crosses the back surface of a respective one of the lenses at a selected wrap angle and at a location nasal to the optical center thereof so as to induce a base-in prism effect.

18 Claims, 2 Drawing Sheets

OPTICALLY SUPERIOR DECENTERED OVER-THE-COUNTER SUNGLASSES

FIELD OF THE INVENTION

The present invention relates generally to eyeglasses, and more particularly to over-the-counter sunglasses of the variety that wrap around the face which include lenses that use small amounts of negative lens power and decentered optical centers to reduce optical distortion and thereby enhance vision.

BACKGROUND OF THE INVENTION

It is well known that whenever the amount of light entering the eye is reduced, the eye pupil dilates. Such dilation occurs when an individual enters into a dark room, and to a lesser extent when sunglasses are worn. In most people, when the pupil is dilated, the eye exhibits natural spherical aberration and reduced vision. Spherical aberration is caused by those light rays entering the periphery of the dilated pupil which otherwise do not enter the pupil when the same is constricted. When the pupil is dilated, these peripheral light rays focus too rapidly in a position which is often located in front of the retina, thus creating a condition of slight myopia (nearsightedness) and reducing distance vision. Individuals who have undergone refractive surgery such as radial keratotomy or excimer laser keratotomy typically experience an increased amount of spherical aberration as a result of the surgery and generally complain that they do not see well at night or when wearing sunglasses.

In recent years, improvements have been made in filtering harmful light rays by contouring sunglasses in a manner wherein they wrap around the wearer's face. Such wrapping places the protective lenses of the sunglasses closer to the wearer's eyes, particularly temporally, and reduces the amount of peripheral unfiltered light which enters the eyes. The increasing popularity of wrap around sunglasses is not only attributable to the greater shielding of the eyes they provide, but to their styling and the athletic image connoted thereby.

Though wrapping sunglasses about the wearer's face enhances peripheral vision and provides better side protection to the eyes, such wrapping creates optical distortion referred to as base-out prism. It has been found that increased amounts of unwanted base-out prism are induced when the lenses of the wrap around sunglasses have steeper lens curves and higher refractive indexes.

The present invention overcomes the above-described deficiencies of prior art wrap around sunglasses. In accordance with the present invention, there is provided wrap around sunglasses which include lenses having a small amount of negative lens power to decrease spherical aberration caused by the sunglasses. The sunglasses of the present invention are configured such that these negative powered lenses are provided with optical centers which are decentered temporally for purposes of inducing base-in prism that neutralizes the wrap induced base-out prism. Importantly, the small amount of negative lens power provided in the lenses is within the lens power tolerance of the American National Standards Institute for over-the-counter sunglasses.

SUMMARY OF THE INVENTION

In accordance with the present invention, there is provided optically superior eyeglasses (e.g., sunglasses) of the wrap around variety which are intended for sale in the over-the-counter market. The eyeglasses of the present invention comprise a frame and a pair of eyeglass lenses which are attached to the frame so as to be positionable over respective ones of the wearer's eyes, i.e., in the paths of the wearer's normal lines of sight. Each of the lenses defines an optical center and includes a spherical and convex front surface which is of a first radius of curvature. In addition to the convex front surface, each of the lenses includes a spherical and concave back surface which is of a second radius of curvature less than the first radius of curvature. This difference in the radius of curvature between the front and back surfaces of the lens causes the same to be thicker at its peripheral edge than at its center, thus imparting a negative power thereto. The optical center of the lens is defined at the thinnest portion thereof.

In the present eyeglasses, each of the lenses is preferably provided with a negative power in the range of about −0.12 to −0.25 diopters, and most preferably about −0.25 diopters. Additionally, each of the lenses is preferably tinted, with the preferred tinting being adapted to block 100% ultraviolet A and 100% ultraviolet B, plus 100% of those visible wavelengths of approximately 380 nanometers through 450 nanometers. The preferred tinting allows 10% light transmission at 475 nanometers and 20% light transmission at 500 nanometers. The preferred tint blocks 80% of the total visual light spectrum. Additionally, each of the lenses may be cut from a lens blank, or alternatively formed directly into its final configuration through the use of an injection molding technique.

In the sunglasses constructed in accordance with the present invention, the frame is sized and configured such that when positioned upon the wearer's head, the lenses are supported thereby (i.e., oriented on the head of the wearer) in a manner wherein the normal line of sight of each of the wearer's eyes crosses the back surface of a respective one of the lenses at a selected angle of wrap and at a location nasal to the optical center thereof. In the present eyeglasses, the preferred wrap angle is greater than about 95 degrees, and most preferably within the range of about 100 to 120 degrees. Additionally, the line of sight of each of the wearer's eyes preferably crosses the back surface of a respective one of the −0.25 diopter powered lenses at a distance of about 1.0 cm nasal to the optical center of the lens. By temporally decentering and providing a negative power to the lenses of the present eyeglasses, a base-in prism effect is created which neutralizes the base-out prism induced by the wrapping of the lenses and resultant passage of the wearer's normal lines of sight therethrough at angles other than perpendicular, i.e., 90 degrees. The amount of base-in prism that is created is dependent upon the negative power of the lenses and the distance the wearer's lines of sight are nasal to the optical centers thereof.

It is contemplated that the eyeglasses constructed in accordance with the present invention need not necessarily include the frame. In this respect, ear stems may be attached directly to the lenses which are sized and spaced relative to each other so as to assume orientations relative to the wearer's normal lines of sight resulting in the desired temporal decentering thereof.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
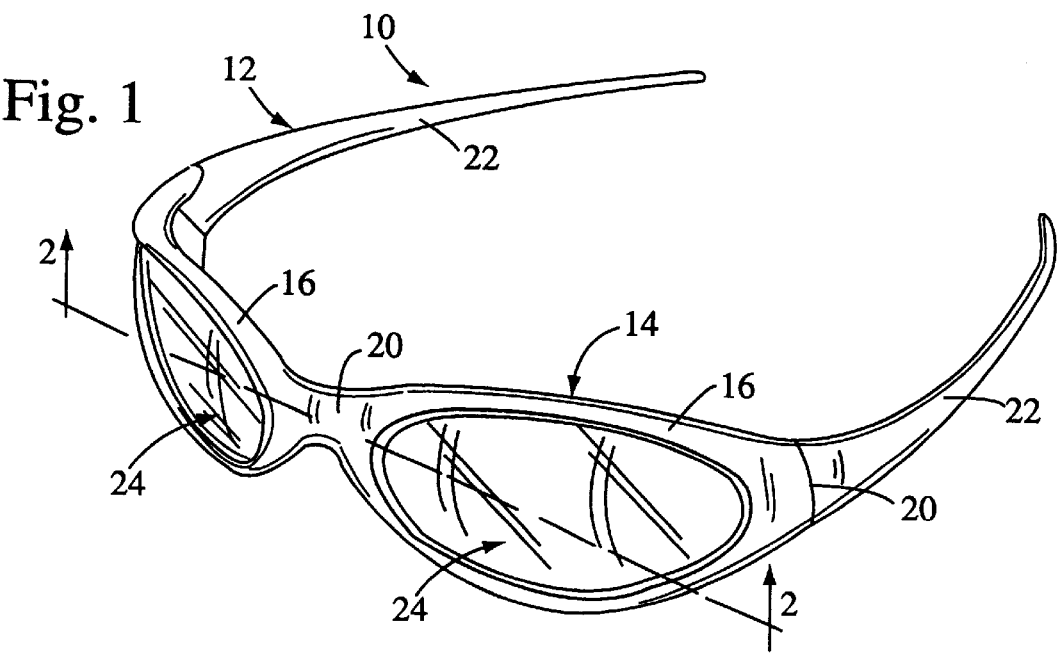
FIG. 1 is a front perspective view of a pair of wrap around sunglasses constructed in accordance with the present invention.

Referring now to the drawings wherein the showings are for purposes of illustrating a preferred embodiment of the present invention only, and not for purposes of limiting the same, FIG. 1 perspectively illustrates the eyeglasses (e.g., sunglasses) constructed in accordance with the present invention. The eyeglasses 10 shown in FIG. 1 are of the wrap around variety, and are contoured so as to wrap around the front and sides of the wearer's face. In the preferred embodiment, the eyeglasses 10 comprise a frame 12 including a frame front 14 which, when the eyeglasses 10 are worn by a wearer, is sized and configured to span across the front and portions of the sides of the wearer's face. The frame front 14 itself includes a pair of lens portions 16 which are integrally connected to each other by a bridge portion 18 of the frame front 14 and each define an outboard edge 20. In addition to the frame front 14, the frame 12 includes an identically configured pair of ear stems 22 which are pivotally connected to respective ones of the outboard edges 20 of the lens portions 16.

Figure 2:
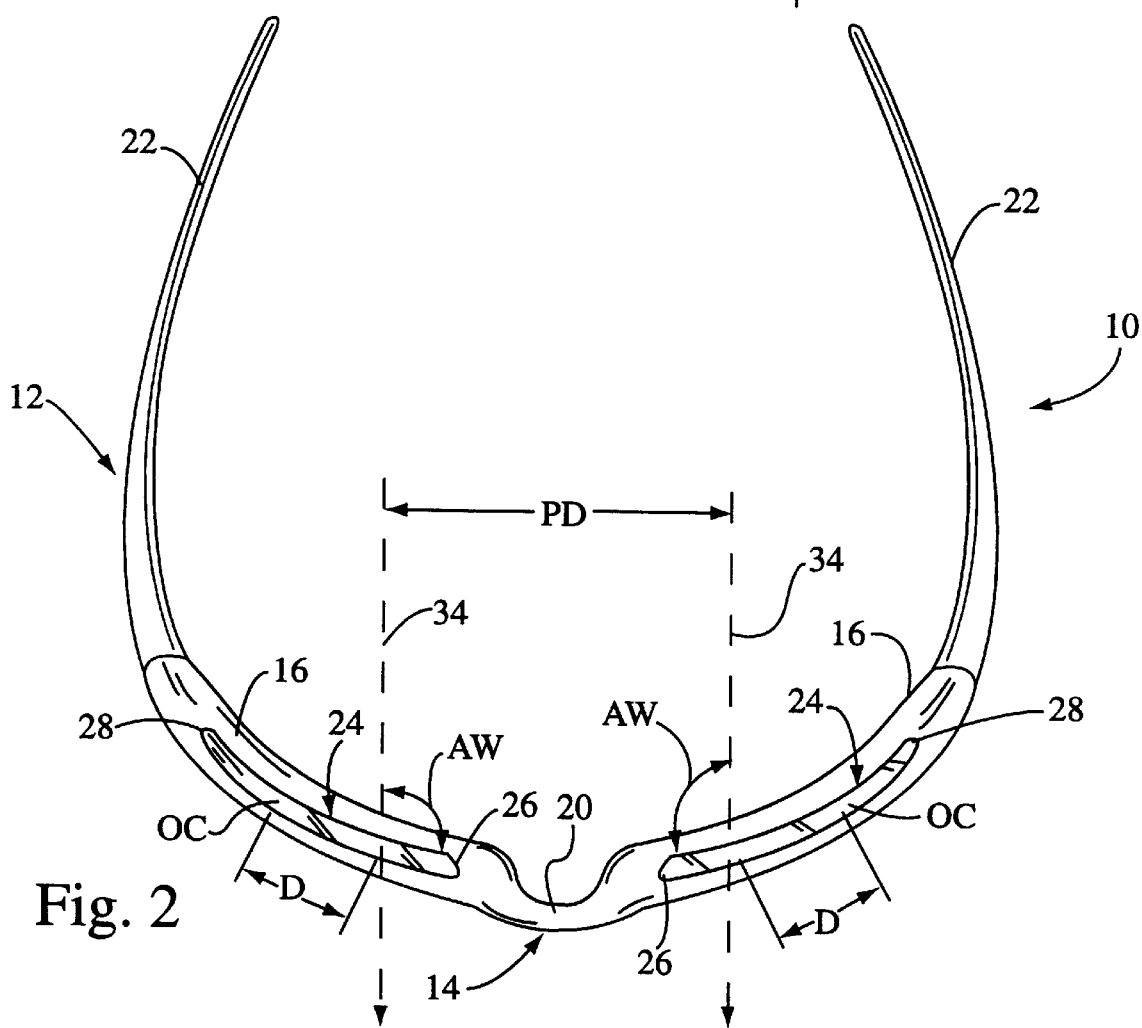
FIG. 2 is a cross-sectional view taken along line 2—2 of FIG. 1, illustrating the manner in which the wearer's lines of sight are decentered from the optical centers of the lenses of the sunglasses and cross the lenses at a selected wrap angle.

Referring now to FIGS. 1 and 2, in addition to the frame 12, the eyeglasses 10 of the present invention include a pair of lenses 24 which are mounted within respective ones of the lens portions 16 of the frame front 14, and more particularly the generally oval-shaped orbitals defined thereby. As will be recognized, the shape of the lenses 24 is complementary to that of the orbitals defined by the lens portions 16 in which the lenses 24 are mounted.

As indicated above, the eyeglasses 10 of the present invention are of the wrap around variety wherein a high degree of wrap is generally desirable for aesthetic styling reasons, for lateral protection of the wearer's eyes from flying debris, and/or for the interception of peripheral light rays. In the present eyeglasses 10, the desired wrap is attained by forming the frame 12 and lenses 24 such that the lenses 24, when mounted within the lens portions 16, are each in a position which is canted or rotated laterally and rearwardly relative to conventional, centrally oriented dual lens mountings. In this respect, when the eyeglasses 10 are worn by the wearer, the canted lenses 24 have orientations relative to the wearer's head which could be viewed as being achieved by starting with conventional dual lens eyewear having centrally oriented lenses, and bending the frame inwardly at the temples to wrap around the sides of the wearer's head.

Figure 3:
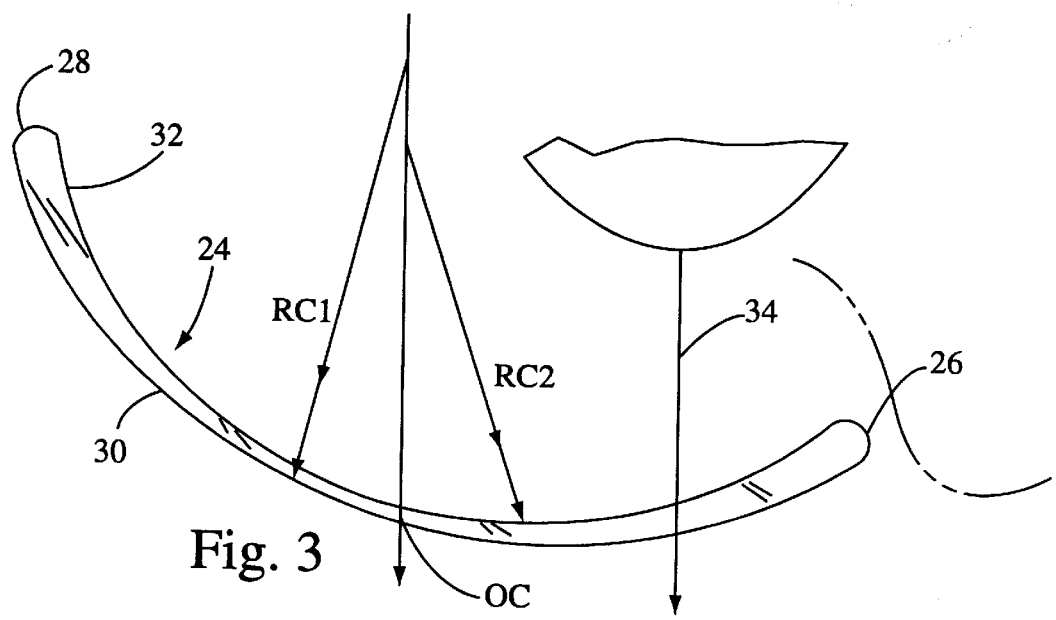
FIG. 3 is a top view of one of the lenses of the sunglasses shown in FIGS. 1 and 2, illustrating a preferred orientation thereof relative to the line of sight of one of the wearer's eyes and a preferred contour for imparting a slight negative power thereto.
Figure 4:
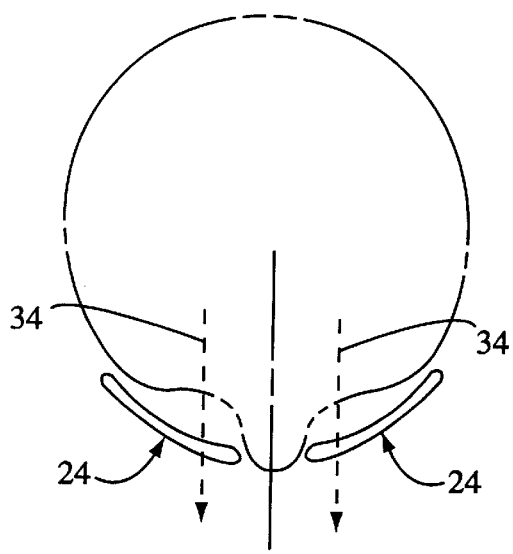
FIG. 4 is a top view of the lenses of the sunglasses shown in FIGS. 1 and 2, illustrating a preferred orientation thereof relative to the lines of sight of the wearer's eyes.

As seen in FIGS. 2–4, each of the lenses 24 of the eyeglasses 10, when viewed in a horizontal plane, has a generally arcuate shape and defines a medial edge 26 which is disposed adjacent the bridge portion 18 of the frame front 14 and a lateral edge 28 which is disposed adjacent the outboard edge 20 of a respective one of the lens portions 16. Each lens 24 further defines a spherical and convex front surface 30 which is of a first radius of curvature RC1 and a spherical and concave back surface 32 which is of a second radius of curvature RC2 less than the first radius of curvature RC1. The difference in the first and second radiuses of curvature RC1, RC2 causes each lens 24 to be thicker at its peripheral edge (including its medial and lateral edges 26, 28) than at its center, thus imparting a negative power thereto. Defined at the thinnest portion of each negative powered lens 24 is the optical center OC thereof.

In the present eyeglasses 10, each of the lenses 24 is preferably formed so as to be provided with a negative power in the range of about –0.12 to about –0.25 diopters, and most preferably about –0.25 diopters. Additionally, each of the lenses 24 is preferably tinted, with the preferred tinting being adapted to block 100% ultraviolet A and 100% ultraviolet B, plus 100% of those visible wavelengths of approximately 380 nanometers through 450 nanometers. The preferred tinting allows 10% light transmission at 475 nanometers and 20% light transmission at 500 nanometers. The preferred tint blocks 80% of the total visual light spectrum. The advantages attendant to providing the lenses 24 with the negative power and tinting will be discussed in more detail below. Importantly, the preferred negative power of –0.25 diopters or less for the lenses 24 is within the tolerances of the American National Standard Institute for over-the-counter sunglasses.

As also shown in FIGS. 2–4, the frame 12 and lenses 24 are formed such that when the eyeglasses 10 are worn by the wearer, the canted lenses 24 thereof extend across the normal lines of sight 34 of the wearer's eyes, and preferably substantially across the wearer's peripheral zones of vision. Each of the wearer's normal lines of sight 34 refers to a line projecting straight ahead of one of the wearer's eyes, with substantially no angular deviation in either the vertical or horizontal planes. For the lenses 24 to extend throughout substantially all of the wearer's range of vision, the arc length of each lens 24 from its medial edge 26 to its lateral edge 28 will generally be within the range of about 1.5 to 3.5 inches, and preferably within the range of about 2.0 to 3.0 inches. The American National Standard Institute has set the average distance PD between the wearer's pupils to be 64 millimeters. As such, the distance separating the wearer's lines of sight 34 will typically be about 64 millimeters.

As is apparent from FIGS. 2–4, as a consequence of the eyeglasses 10 being wrapped about the wearer's face and the lenses 24 thereof being canted, the wearer's normal lines of sight 34 do not strike the lenses 24 perpendicularly. In this respect, the canting of the lenses 24 shifts the normal lines of sight 34 out of a collinear relationship with the optical center lines of the lenses 24, thus altering the optics thereof. In prior art dual lens eyewear which wraps around the sides of the wearer's face, the above-described shifting of the sight lines is typically accompanied by some degree of prismatic distortion commonly referred to as "base-out prism".

In the present eyeglasses 10, if the wearer's lines of sight 34 were to be perpendicular to the lenses 24, the frame 12 would have to be formed and the lenses 24 cut or molded such than when the eyeglasses 10 were worn by the wearer, the optical centers OC of the lenses 24 would be separated by a distance of about 64 millimeters. Such separation would cause the wearer's lines of sight 34 to pass through the approximate optical centers OC of the lenses 24, and would prevent the inducement of any base-out prism. However, as described above, the canting of the lenses 24 results in the passage of the wearer's lines of sight 34 therethrough at angles other than 90 degrees.

When the present eyeglasses 10 are positioned upon the wearer's head, the preferred size and configuration of the frame 12 and lenses 24 causes the lenses 24 to be oriented on the head of the wearer in a manner wherein the normal line of sight 34 of each of the wearer's eyes crosses the back surface 32 of a respective one of the lenses 24 at an angle of wrap AW. In the eyeglasses 10, the wrap angle AW is preferably greater than about 95 degrees, and most preferably within the range of about 100 to 120 degrees to provide the desired level of wrap when the eyeglasses 10 are worn by the wearer. In this respect, in the horizontal plane, the preferred wrap angle AW is determined by styling considerations and the need to laterally protect the wearer's eyes from peripheral unfiltered light rays and foreign debris.

As explained above, the passage of a wearer's lines of sight through eyeglass lenses at angles other than 90 degrees (i.e., at desired wrap angles) is typically accompanied by some level of base-out prism. A practical method of determining the amount of base-out prism induced by the wrapping or canting of any lens around the wearer's face is to measure the lens with a lensometer. The lens must be measured while tilted at its desired wrap angle and at the location where the wearer's line of sight penetrates the lens. The amount of base-out prism induced in a canted lens may also be calculated through the use of Snell's Law.

Importantly, the measured base-out prism of a lens can be neutralized by inducing an equal amount of base-in prism within the same lens. In the present eyeglasses 10, the passage of each of the wearer's lines of sight 34 through a respective lens 24 at a wrap angle AW in the preferred range would normally result in the inducement of base-out prism in the amount of about 0.25 diopters. As will be explained below, this base-out prism is effectively neutralized in the present eyeglasses 10 by temporally decentering each of the negatively powered lenses 24 so as to induce a level of base-in prism which cancels out the base-out prism.

In the eyeglasses 10, the amount of base-in prism that is created is dependent upon the negative power of the lenses 24 and the distance the wearer's lines of sight 34 are nasal to the optical centers OC thereof. The science of optics provides Prentice's Law for calculating the amount of prism created by decentering a powered lens. More particularly, Prentice's Law states that prism diopters is equal to lens power multiplied by the distance of decentration in centimeters. As will be recognized, in the eyeglasses 10, the level of base-in prism is calculated so as to completely neutralize or cancel out the base-out prism created by the passage of the wearer's lines of sight 34 through the lenses 24 at the wrap angles AW.

As explained above, in the eyeglasses 10 of the present invention, the base-out prism induced by the passage of the lines of sight 34 through the lenses 24 at the wrap angles AW is about 0.25 prism diopters. Accordingly, a level of base-in prism of about 0.25 prism diopters is required to neutralize the base-out prism. In the eyeglasses 10, the preferred size and configuration of the frame 12 results in the lenses 24 being supported thereby so as to be oriented on the wearer's head in a manner wherein the normal line of sight 34 of each of the wearer's eyes crosses the back surface 32 of a respective lens 24 at a location nasal to (i.e., temporally decentered from) the optical center OC thereof. In particular, the line of sight 34 of each of the wearer's eye preferably crosses the back surface 32 of a respective lens 24 at a decentering distance D of about 1.0 cm nasal to the optical center OC of the lens 24.

Applying Prentice's Law, a base-in prism level of 0.25 prism diopters is needed to neutralize the base-out prism of 0.25 prism diopters in the eyeglasses 10 is achieved by multiplying the preferred lens power of −0.25 diopters by the preferred distance of decentration of 1.0 cm per lens 24. Thus, the temporal decentering of the lenses 24 of the eyeglasses 10 in the above-described manner, coupled with the negative lens powers thereof, induces base-in prism which neutralizes the base-out prism attributable to the wrapping of the lenses 24 and resultant passage of the wearer's normal lines of sight 34 therethrough at the wrap angles AW. The negative power of the lenses 24, in addition to contributing to the inducement of the required level of base-in prism, also alleviates some of the adverse effects of spherical aberration.

Figure 5:
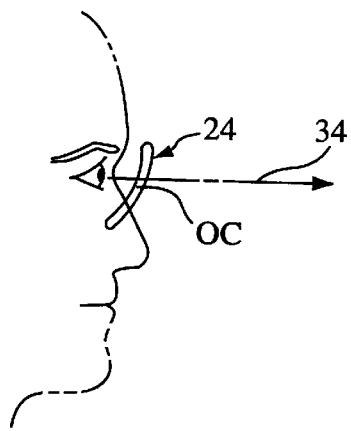
FIG. 5 is a side view of one of the lenses of the sunglasses shown in FIGS. 1 and 2, illustrating a preferred orientation thereof relative to the line of sight of one of the wearer's eyes.

In the preferred embodiment, the frame 12 is constructed such that the points at which the wearer's lines of sight 34 cross the back surfaces 32 of the lenses 24 (i.e., the temporally decentered distances of 1 cm from the optical centers OC of the lenses 24) are separated by approximately 64 mm. Referring now to FIG. 5, correction for prismatic distortion attributable to the tilting of the lenses 24 in the vertical plane may be accomplished in the same manner as described above for tilting in the horizontal plane. Importantly, when the wearer of the eyeglasses 10 of the present invention looks to his or her right, the wearer's right eye will be subjected to a decreased amount of base-in prism, with the wearer's left eye experiencing an equal amount of increase in base-in prism. The opposite takes place when the wearer looks to his or her left. This phenomenon maintains the neutralization of the wrapping induced base-out prism as the wearer's gaze shifts from side to side.

Those of ordinary skill in the art will recognize that the present invention has application to lenses of many different shapes and orientations beyond those shown and described herein. In this respect, the particular shape of each lens 24 is not critical to the present invention in that such lenses 24 may fall within the scope of the present invention despite having other shapes. The lenses 24 may be manufactured by any one of a variety of processes known in the art. One such process involves cutting each lens 24 from a preformed injection molded lens blank. Alternatively, each lens 24 can be molded directly into its final shape and size to eliminate the need for post molding cutting steps. Typically, each lens 24, or the lens blank from which it is cut, will be injection molded and comprise a relatively rigid and optically acceptable material such as polycarbonate, though other polymeric lens materials such as high index plastics may also be employed for each lens 24. Each lens 24 or lens blank can also be stamped or cut from generally planar tapered sheet stock and then bent into the desired curved configuration in accordance with the present invention, with such curved configuration being maintained by heating the curved sheet or the use of a relatively rigid frame 12. In the preferred embodiment, the curvature of the front and back surfaces 30, 32 of each lens 24 are created through lens blank molding and polishing processes. Those of ordinary skill in the art will recognize that the present invention may also be applicable to glass lenses.

As indicated above, each of the lenses 24 is preferably tinted, with the preferred tinting being adapted to block 100% ultraviolet A and 100% ultraviolet B, plus 100% of those visible wavelengths of approximately 380 nanometers through 450 nanometers. The preferred tinting allows 10% light transmission at 475 nanometers and 20% light transmission at 500 nanometers. The preferred tint blocks 80% of the total visual light spectrum.

The particular configuration of the frame 12 is also not essential to the present invention. In this respect, the frame 12, and in particular the frame front 14 thereof, may bound only the bottom edges of the lenses 24, only the top edges of the lenses 24, or the entire periphery of the lenses 24 as illustrated herein. Alternatively, the frame front 14 can bound any other portions of the lenses 24 as is evident to those of ordinary skill in the art. Frameless eyeglasses, such as those wherein the ear stems 22 are attached directly to the lenses 24, may also be constructed in accordance with the present invention, so long as the orientation of the lenses 24 on the head of the wearer and relative to the wearer's eyes is substantially maintained in the predetermined relationships to the normal lines of sight 34 as discussed above. The frame 12 may comprise any of a variety of metals, composites or relatively rigid, molded thermoplastic materials which are known in the art, and may be transparent or of any of a variety of colors.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. Optically superior eyeglasses, comprising:
   a frame; and
   a pair of lenses attached to said frame and positioned over respective ones of the wearer's eyes, each of said lenses defining an optical center and comprising:
     a convex front surface having a first radius of curvature; and
     a concave back surface having a second radius of curvature which is less than the first radius of curvature so as to provide a negative power;
   said frame being sized and configured such that when positioned upon the wearer's head, the lenses are supported thereby in a manner wherein the normal line of sight of each of the wearer's eyes crosses the back surface of a respective one of the lenses at a selected wrap angle and at a location nasal to the optical center thereof which, in combination with the negative power, induces base-in prism to substantially neutralize the base-out prism induced by the wrap angle.

2. The eyeglasses of claim 1 wherein the wrap angle is greater than about 95 degrees.

3. The eyeglasses of claim 2 wherein the wrap angle is within the range of about 100 to 120 degrees.

4. The eyeglasses of claim 1 wherein each of the lenses is provided with a negative power in the range of about −0.12 to about −0.25 diopters.

5. The eyeglasses of claim 4 wherein each of the lenses is provided with a negative power of about −0.25 diopters.

6. The eyeglasses of claim 1 wherein the location that the line of sight of each of the wearer's eyes crosses the back surface of a respective one of the lenses is about 1.0 cm nasal to the optical center thereof.

7. The eyeglasses of claim 1 wherein each of the lenses is tinted.

8. The eyeglasses of claim 7 wherein each of the lenses is tinted to block:
   100% ultraviolet A;
   100% ultraviolet B;
   100% of visible wavelengths of approximately 380 nanometers through 450 nanometers; and
   80% of the total visual light spectrum.

9. The eyeglasses of claim 7 wherein each of the lenses is tinted to allow:
   10% light transmission at 475 nanometers; and
   20% light transmission at 500 nanometers.

10. Optically superior eyeglasses, comprising:
    a pair of lenses positionable over respective ones of the wearer's eyes, each of said lenses defining an optical center and comprising:
      a convex front surface having a first radius of curvature; and
      a concave back surface having a second radius of curvature which is less than the first radius of curvature so as to provide a negative power;
    said lenses being positionable over respective ones of the wearer's eyes such that the normal line of sight of each of the wearer's eyes crosses the back surface of a respective one of the lenses at a selected wrap angle and at a location nasal to the optical center thereof which, in combination with the negative power, induces base-in prism to substantially neutralize the base-out prism induced by the wrap angle.

11. The eyeglasses of claim 10 wherein the wrap angle is greater than about 95 degrees.

12. The eyeglasses of claim 11 wherein the wrap angle is within the range of about 100 to 120 degrees.

13. The eyeglasses of claim 10 wherein each of the lenses is provided with a negative power in the range of about −0.12 to about −0.25 diopters.

14. The eyeglasses of claim 13 wherein each of the lenses is provided with a negative power of about −0.25 diopters.

15. The eyeglasses of claim 10 wherein the location that the line of sight of each of the wearer's eyes crosses the back surface of a respective one of the lenses is about 1.0 cm nasal to the optical center thereof.

16. The eyeglasses of claim 10 wherein each of the lenses is tinted.

17. The eyeglasses of claim 16 wherein each of the lenses is tinted to block:
    100% ultraviolet A;
    100% ultraviolet B;
    100% of visible wavelengths of approximately 380 nanometers through 450 nanometers; and
    80% of the total visual light spectrum.

18. The eyeglasses of claim 17 wherein each of the lenses is tinted to allow:
    10% light transmission at 475 nanometers; and
    20% light transmission at 500 nanometers.

* * * * *